I. B. KEMPSHALL.
TIRE.
APPLICATION FILED JUNE 18, 1910.

973,278.

Patented Oct. 18, 1910.

2 SHEETS—SHEET 1.

Witnesses
H. O. Murray
Roy G. Beall

Inventor
I. B. Kempshall
By
Attorney

I. B. KEMPSHALL.
TIRE.
APPLICATION FILED JUNE 18, 1910.

973,278.

Patented Oct. 18, 1910.
2 SHEETS—SHEET 2.

Witnesses
Inventor
I. B. Kempshall
By
Attorney

UNITED STATES PATENT OFFICE.

IVA BELLE KEMPSHALL, OF BOSTON, MASSACHUSETTS.

TIRE.

973,278.　　Specification of Letters Patent.　　Patented Oct. 18, 1910.

Application filed June 18, 1910. Serial No. 567,678.

*To all whom it may concern:*

Be it known that I, IVA B. KEMPSHALL, a citizen of the United States, residing at Boston, in the county of Suffolk and State of Massachusetts, have invented certain new and useful Improvements in Tires; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in tires, designed primarily for automobiles.

The prime object of the invention is to provide a tire structure, which will effectually withstand the strain of the load pressure, and to provide means for preventing the usual reinforcing ribs from cracking.

According to my present invention I provide a series of radially disposed reinforcing ribs or projections, adjacent an annular tread, the said radial ribs terminating at the level of the base of the annular tread rim, so that when the latter expands laterally under excessive load pressure, the outer surfaces of the radial ribs will act as abutments.

The invention also comprehends improvements in the structural details, which will be hereinafter described, and particularly pointed out in the claims.

Figure 1:
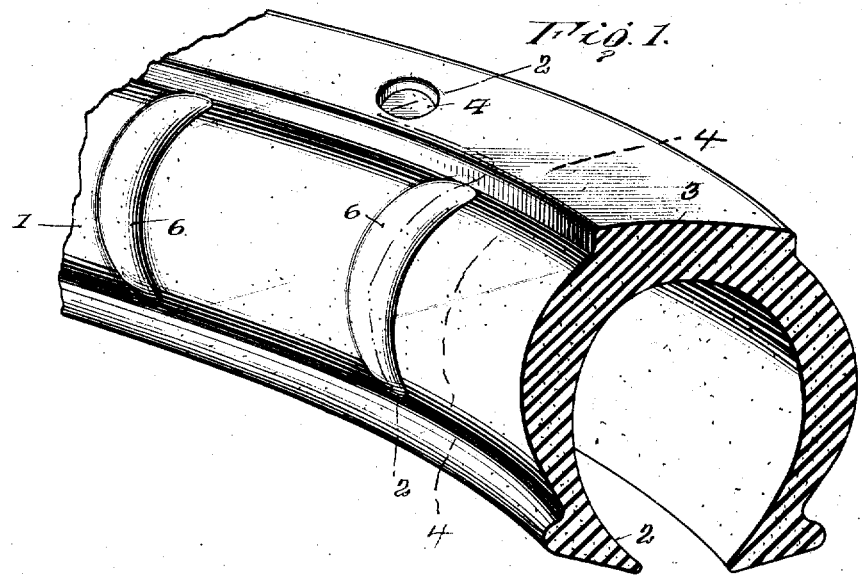
Figure 2:
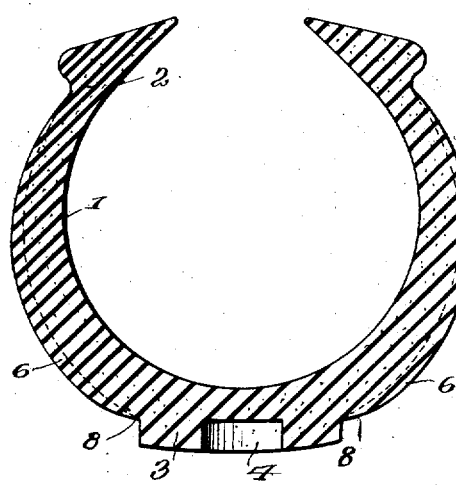
Figure 3:
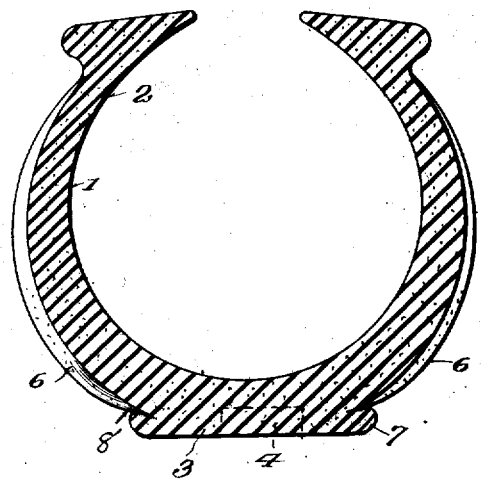
Figure 6:
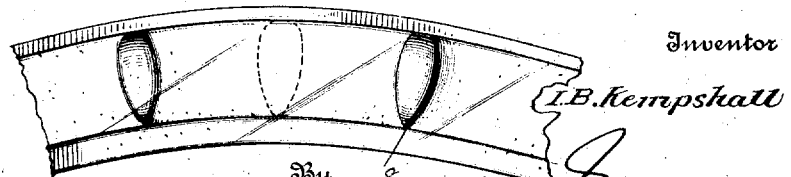
Figure 4:
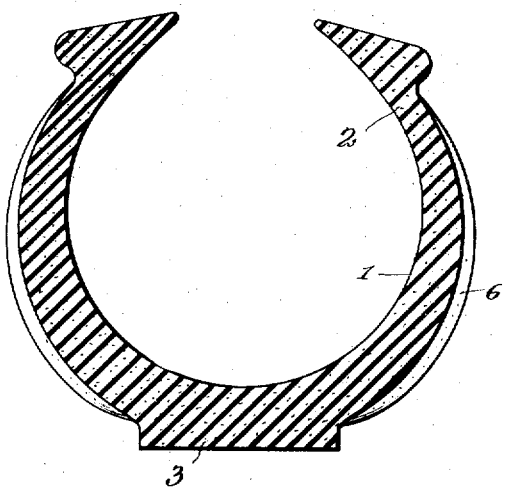
Figure 5:
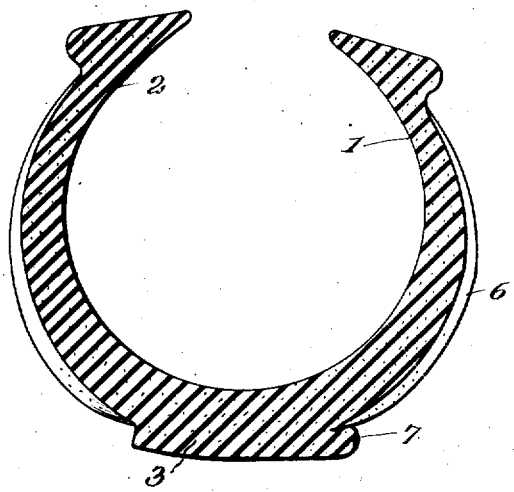

In the drawings: Figure 1 is a perspective view of a portion of my improved tire. Fig. 2 is a transverse section of the same on the line 2—2 of Fig. 1. Fig. 3 is a view similar to Fig. 2, but illustrating the tread surface of the tire under load pressure. Fig. 4 is a view similar to Fig. 2, but taken on the line 4—4 of Fig. 1, and showing the tread flat. Fig. 5 is a diagrammatic illustration of the tire passing around a curve. Fig. 6 is a side view of a slight modification.

The same numerals refer to like parts in all the figures.

1 indicates a tire, the walls of which taper from the tread to their inner edges indicated at 2. The tread of the tire is extended to provide a thickened wall or extended tread rim 3, the surface of which is slightly convex, and the side walls of which are preferably parallel, and are uninterrupted throughout the entire circumference of the tire. The tread surface of the rim is preferably provided with a series of pockets or suction cups 4, designed to prevent the tire from skidding.

In order to effectually brace the sides of the main body portion of the tire, and at the same time afford a substantial means for resisting excessive load strain when applied to the tread rim 3, I have arranged a plurality of lateral ribs or braces 6, which are preferably radially disposed, and which taper toward the inner edge of the tire. The outer or enlarged ends of the lateral ribs or braces terminate at the level of the base of the annular tread rim 3, so as to leave the side walls of the latter uninterrupted, as previously stated, and at the same time permit the said rim to freely laterally expand when load pressure is applied. The outer upper edges of the ribs 6 are disposed inwardly some distance from the outer edges and side walls of the annular tread rim, so that they do not come into active operation to coöperate with the annular tread rim, to accomplish the purpose of this invention, until the load pressure is in excess of what may be termed a determinate normal pressure on the rim 3. The ribs 6 are convex in outline, and gradually taper toward all sides to obviate the formation of corners or sharp edges.

In operation the convex tread surface of the flange 3 receives the load pressure, which, under normal circumstances, would be somewhat compressed, the strain being distributed throughout the entire tire surface. Under these circumstances the lateral ribs 6 simply serve as side braces for the body of the tire, and to a great degree prevent the latter from compressing too freely, it being one of the purposes of this invention to have the yielding action take place in the rim 3. Thus it will be seen that, inasmuch as the lateral ribs do not bend or yield with the rim 3, the said ribs will not crack or split. When the load pressure exceeds the predetermined normal pressure the rim 3 will necessarily become greatly compressed, and the parallel side walls will tend to expand laterally, as illustrated in a conventional manner at 7, in Fig. 3. The thrust of excessive pressure is received on the outer faces of the ribs at the points 8, which will prevent said ribs from cracking. The abnormal lateral extended portion of the sides of the rim 3, when maximum load pressure is applied, forms in rolls 7, which impinge the outer faces of the ribs, and thereby the latter act as a plurality of stiff braces, which retard the inward movement of the rim. The convex tread surface of the rim is of considerable importance in a tire of this type, inasmuch as it tends to cause the minimum load pressure to be distributed throughout the central part of the annular tread rim before the side walls commence to laterally expand or bulge beyond the normal. Furthermore, by making the surface convex, when excessive load pressure occurs, a greater lateral extension or bulging effect of the sides of the rim will take place to form a larger body of resilient material to engage with the outer faces of the ribs.

The pockets, or suction cups, being preferably disposed alternately between the ribs, the side walls of the rim 3 will give more readily than at points opposite the ribs; thereby the bulging or lateral expansion of the side walls will be greater, and the braces are therefore not so essential at these points.

When turning a corner, the tire naturally tilts, and it is under these conditions the uninterrupted side walls of the rim come prominently into play. That is to say, as the strain of the load pressure is on but one side, as shown in the diagram illustrated in Fig. 5, the lateral bulging of the side wall of the flange will be greater than if the tire were operating in a normal position. Therefore, it is of the utmost importance that the sides and body be properly braced to receive this undue strain, and from an inspection of Fig. 5 it will be seen the outer surfaces of the ribs will act as stops or abutments for the portion 7 of the rim, and thereby distribute the strain to and throughout the entire tire body.

The ribs 6 may be alternately distributed with reference to each other on opposite sides of the tire, as shown in Fig. 6. Under certain circumstances this construction will be effective to distribute the load strain.

To insure of the side walls of the rim bulging sufficiently to overlie the outer faces of the ribs, I may undercut them somewhat, but I prefer the parallel walls.

What I claim is:

1. A tire provided on its tread surface with an annular tread rim, the tread face of the annular tread rim being convex, and ribs on the sides of the tire, the ends of said ribs terminating each at the level of the base of the tread rim and extending outwardly beyond the latter and toward the inner edge of the tire, whereby when load pressure is applied the tread rim will in being compressed, expand laterally beyond the normal plane of the side of the tread rim, and the outer surfaces of said ribs will receive the lateral expanded ends of the annular tread rim, and serve to resist said load pressure, and brace the sides of the body of the tire.

2. A tire provided on its tread surface with an annular tread rim, whose opposite outer walls are substantially flat, and ribs on the sides of the tire, the ends of said ribs terminating each at the level of the base of the annular tread, rim and extend outwardly beyond the latter and toward the inner edge of the tire, whereby, when load pressure is applied, the tread rim will in being compressed expand laterally beyond the normal plane of the side faces of the tread rim, and the outer surfaces of said ribs will receive the lateral expanded ends of the tread rim, and serve to resist said load pressure, and brace the sides of the body of the tire.

3. A tire provided on its tread surface with an annular tread rim and ribs on the sides of the tire, the ends of said ribs terminating each at a point some distance from the outer edges of the tread rim and extend outwardly beyond the latter whereby when load pressure is applied the tread rim will, in being compressed expand laterally beyond the normal plane of the side faces of said tread rim, and the outer surfaces of said ribs will receive the lateral expanded ends of the tread rim, and serve to resist said load pressure, and brace the sides of the body of the tire.

In testimony whereof I have signed my name to this specification in the presence of two subscribing witnesses.

IVA BELLE KEMPSHALL.

Witnesses:
JAMES H. DOHERTY,
JOHN J. REGAN.